United States Patent [19]

Douine et al.

[11] Patent Number: 5,648,846
[45] Date of Patent: Jul. 15, 1997

[54] APPARATUS AND METHOD FOR THE GEOMETRIC MEASUREMENT OF A VEHICLE

[75] Inventors: Denis Douine, Lagny sur Marne; Michel Galland, Lognes; Alain Perchat, Noisy-le-Grand; René Rouchaville, Vaires-sur-Marne, all of France

[73] Assignee: Muller Bem, Chartres, France

[21] Appl. No.: 718,695

[22] Filed: Sep. 27, 1996

Related U.S. Application Data

[63] Continuation of Ser. No. 320,242, Oct. 11, 1994, abandoned.

[30] Foreign Application Priority Data

Oct. 11, 1993 [FR] France .................................. 93 12059
Oct. 20, 1993 [FR] France .................................. 93 12526

[51] Int. Cl.$^6$ .............................. G01B 11/26; G01B 5/24
[52] U.S. Cl. .................... 356/139.09; 356/141.5; 33/203.18; 33/288
[58] Field of Search ............................ 356/139.09, 141.5; 33/203.18, 203.19, 203.2, 288; 250/206.1, 206.2

[56] References Cited

U.S. PATENT DOCUMENTS 3,409,991  11/1968  Davis et al. .................................. 33/335
3,865,492  2/1975   Butler ........................................ 356/155
4,718,759  1/1988   Butler ..................................... 356/139.09
4,736,184  4/1988   Arriazu ..................................... 338/162
5,168,632  12/1992  Rimlinger, Jr. ............................... 33/288
5,489,979  2/1996   Corghi .................................... 356/139.09
5,489,983  2/1996   McClenahan et al. ...................... 356/139.09

FOREIGN PATENT DOCUMENTS

0460470  12/1991  European Pat. Off. .
0521254  1/1993   European Pat. Off. .
2176837  11/1973  France .

Primary Examiner—Thomas H. Tarcza
Assistant Examiner—Pinchus M. Laufer
Attorney, Agent, or Firm—Young & Thompson

[57] ABSTRACT

The geometric measurement of a vehicle is effected by apparatus comprising a casing (1) with an axle (2) protruding from the casing. The axle (2) is mounted for rotation in the casing (1) and engages with its protruding end and is fixed to a support element (3) secured to a wheel of the vehicle to be inspected. The casing (1) contains a camera block (13) for measuring the orientation of the wheel in the vertical plane, a potentiometer (12) for following the angle of the wheel, a device (11) for measuring inclinations in a vertical plane perpendicular to and in a vertical plane parallel to the wheel, connected to an electronic card (10). The camera block (13), the potentiometer (12) and the device (11) connected to an electronic card (10) emit electrical signals representative of indications correlated with the physical parameters to be detected for the geometrical inspection of a vehicle.

24 Claims, 6 Drawing Sheets

APPARATUS AND METHOD FOR THE GEOMETRIC MEASUREMENT OF A VEHICLE

This application is a continuation of application Ser. No. 08/320,242, filed Oct. 11, 1994, now abandoned.

FIELD OF THE INVENTION

The invention relates to an apparatus for the geometric measurement of a vehicle, as well as a method of using this apparatus.

BACKGROUND OF THE INVENTION

Numerous apparatus are known for the geometric measurement to align vehicle wheels, particularly those described in U.S. Pat. Nos. 3,865,492, 3,901,604, 4,319,838, 4,594,789, 4,854,702 and 5,018,853.

In these known apparatus, a source of light radiation secured to a wheel of the inspected vehicle illuminates a receiver secured to another wheel of the vehicle, which supplies a signal processed by the processing and application device of the signals to supply the desired angular values.

The usual arrangement of the geometric inspection apparatus of automotive vehicles is described particularly in U.S. Pat. No. 4,311,386: an assembly of six measurement casings is secured to the front and rear wheels of the inspected vehicle; a casing for each rear wheel and an assembly of two casings is rigidly interconnected to each front wheel. Each casing comprises a light source and a receiver sensitive to radiation emitted by the source, whereby the radiation source of a first casing shines toward the receiver of a second casing and the light source of this second casing shines toward the receiver of this first casing.

U.S. Pat. No. 4,311,386 thus discloses a process for measuring the parallelism of the wheels of the forward and rear trains of the automotive vehicles and an apparatus for practicing this process. To this end, there is disposed at the level of each front wheel a laser beam source, there is projected from the emitter associated with each front wheel a laser beam transversely in front of the vehicle in the direction of the other front wheel, said beam striking a receiver, there is projected from the same emitter associated with one of the front wheels a third laser beam toward a reflecting mirror disposed at the corresponding rear wheel and the third laser beam reflected from a third receiver associated with the same forward wheel is received, then for each receiver associated with a laser source, the distance between the point of impact of the laser beam and a zero reference is noted. The receiver associated with each of the laser beams projected from the emitter of a front wheel transversely in front of the vehicle is disposed in advance of the other front wheel. There is also projected, from the emitter of the other front wheel, a fourth laser beam toward a second reflecting mirror disposed at the corresponding rear wheel and there is received the fourth laser beam reflected from a fourth receiver associated with the same other front wheel and the distance between the point of impact of said laser beam and a zero reference is noted. The observed distances are introduced into the four receivers by a computer which supplies the array of the geometric characteristics of the vehicle, knowing the path and the wheel base of the vehicle.

However, in this improved method and apparatus, it is also necessary to align a wheel, for example a front wheel. To this end, the vehicle is raised and the forward wheel is caused to turn in the forward direction of the vehicle, so as to determine the misalignment curve of the wheel. The wheel is continued to be turned until the wheel will be in the position corresponding to median misalignment, then the vehicle is rested on the ground while maintaining the wheel in this position, which theoretically avoids influencing the parallelism when the wheel is in a position in which the median misalignment is horizontal and the maximum misalignment is vertical. One operates in an analogous fashion to effect the alignment of a rear wheel.

It will be noted, however, when the vehicle is rested on the wheels, that the action of the suspension devices, in particular the action of the suspension arm on the front wheel, gives rise to an undesired rotation of the wheel by an angle of the order of 10° between the beginning of contact of the tire with the ground and the complete resting of the wheel on the ground. As a result there is an imperfection of measurement, because of the fact that the wheels resting on the ground are located in undesired angular positions, corresponding to a value of misalignment different from the mean misalignment.

An object of the invention is to improve the geometric measurement of vehicles, by supplying permanently the real value of the wheel angle, so as to effect a correction of the measurements as a function of the real misalignment of the wheel. By misalignment will be generally understood a curve or a sinusoidal signal varying as a function of the angular position of the wheel and representative of transverse deformations of the rim or the wheel.

The document DE-4 121 655 discloses an apparatus for measuring the angular position of the wheel, permitting deriving the value of misalignment of the wheel. Thanks to this device, it is possible to know the real position of the wheel, so as to be able to compensate the geometric measurements by a correction dependent on the phase of misalignment. To know the angular position of the wheel, there is provided mounted on an axis secured to a support fixed rigidly to the wheel, a toothed wheel, which drives a pinion coupled with a measurement converter supplying an electrical signal representative of the angular position of the wheel. The axle of the toothed wheel is disposed coaxially with the axis of the wheel, which gives rise to a measurement error corresponding to the relative play between said pinion and said toothed wheel.

A second object of the invention is to improve the measurement of the angular position of the wheel by means of an apparatus simultaneously integrating the conventional measurement means of the known values of parallelism and effecting corresponding corrections as a function of the misalignment of each wheel of the vehicle, in particular by correcting the values of parallelism obtained by means of apparatus with particular radiant light sources having an improved resolution and an improved measurement range, of simple design and economical manufacture, particularly using only low cost optical receivers of the linear type.

A third object of the invention is to provide an unchanging position of the device relative to the support secured to the wheel rim and to avoid any error arising from positioning errors resulting from successive mounting and demounting of the apparatus relative to the wheel rim.

SUMMARY OF THE INVENTION

The invention has for its object the provision of an apparatus for measuring geometry parameters of wheels of a vehicle, comprising at least two head units, each said head unit being provided with an axle protruding out of said head unit, said axle being rotatively mounted in said head unit and being engaged by its protruding extremity in and fixed to a supporting device clamped to a wheel of said vehicle, each said head unit enclosing:

means for measuring the orientation of the wheel in the horizontal plane, means for surveying the rotational angle of the wheel around its axis, means for measuring the inclinations in a vertical plane perpendicular and in a vertical plane parallel to the wheel; said means being mounted on or connected to an electronic card;

wherein said means for measuring the orientation of the wheel in the horizontal plane, said means for surveying the rotational angle of the wheel around its axis, and said means mounted on or connected to an electronic card transmit electrical signals representative of parameters correlated to physical parameters to be detected for operating and testing the geometry of the vehicle.

According to one or several other characteristics of the invention:

the axle bears two spaced and parallel conformations, the first of which abuts against a reference location of said supporting device and the second of which abuts against a reference location of said head unit, in order to provide invariable and reproducible mounting of said head unit on said supporting device by means of said axle after blocking relative to each other: said head unit, said axle and said supporting device;

the apparatus further comprises an electronic processing and calculating board for processing and calculating data based on said electrical signals transmitted by said means for measuring the orientation of the wheel in a horizontal plane, said means for surveying the rotational angle of the wheel, said means for measuring the inclinations in a vertical plane perpendicular and parallel in a vertical plane to the wheel; and a display panel able to exchange information in order to provide the operator with guidance according to the guidelines transmitted by said electronic processing and calculating board;

the means for measuring the orientation of the wheel in a horizontal plane comprises a camera unit provided with at least one slit or cylindrical lens or equivalent image defining means transparent to a light radiation transmitted by an external light source and provided with at least one linear optical sensor, said optical sensor being placed behind said slit relative to the incident direction of the image of the source defined by the slit, wherein said sensor forms an acute angle with the plane passing through the longitudinal axis of said slit and the longitudinal axis of said image of the source defined by the slit;

said acute angle is preferably comprised between 30 and 60 degrees of arc, the detector is located in a plane parallel to the plane of the slot and forms with the direction perpendicular to a longitudinal axis of the slot an acute angle, or the detector is located in a plane which makes an acute angle with the optical axis of the incident beam, the apparatus comprises at least one return mirror for the incident beam, so as to minimize the volume and dimensions of the casing, the apparatus comprises at least one casing which comprises several slots, or image definition members, the casing comprises at least one deflecting prism for light rays, so as to minimize the spacing between the slots, the slot is in the shape of a cross comprising two perpendicular slots or members for defining a perpendicular image, the cross supports, adjacent the optical axis, a thread or film adapted to be projected on a bridge of the linear optical detector, at least one slot is replaced by a filament or an opaque comb, so as to define an inverted image on the linear optical receiver, the casing carries a source of light radiation which is a lamp of the gas tube type producing illumination between two electrodes, in the case of a device comprising several slots, the width of a given slot is different from the width of another slot, one slot is a dynamic slot, the measurement means of the angular position of the wheel is mounted directly coaxially of said axle emerging from the casing;

the measurement means of the angular position of the wheel comprises a dead angular zone;

the axle protruding from the housing carries indexing means of the side of the end engaging in the support element, so as to mount the axle and the casing maintained horizontal in a preadjusted angular position;

the measurement means of the angular position of the wheel is a potentiometric receiver;

the potentiometric receiver is of the serigraphic track type;

the measurements means for the inclination in vertical planes respectively parallel and perpendicular to the wheel comprise an inclinometer of the conductive liquid drop type;

the device comprises also means for measuring the inclination in a vertical plane parallel to the wheel.

The invention also has for its object a method for using a device according to the invention, characterized in that the method is of the interactive type between an operator and a display screen receiving its indications from a processing and computing card comprising memories and programmable microprocessors.

According to one or several other characteristics of the invention:

a/ the display screen indicates to the operator to place the wheel support vertical, to fix rigidly the housing maintained horizontal on the axle, to trigger the measurements by means of the mentioned detectors and to store these measurements in memories provided for this purpose on the electronic processing and computing card;

b/ the display screen indicates to the operator to unlock the knurled knob to permit relative rotation between the axle and the housing, to turn the wheel in a predetermined direction, for example to the left, to start the measurements by the mentioned detectors and to store these measurements in the recited memories of the electronic card;

c/ the display screen indicates to the operator to turn the wheel in another predetermined direction, for example to the right, to trigger the measurements and to store these measurements in the electronic card.

the operator turns the wheel one step (a/, or b/) to the following step (b/, or c/) with an angular precision of the order of 30 degrees of arc.

the vehicle wheel is driven in rotation by motor means, of the rolling belt type or of the motorized drive roller type.

the vehicle to be measured is provided with devices according to the invention, then is driven so as to effect the alignment and the corrections of the geometric values during movement of the vehicle.

the vehicle to be controlled is provided with devices according to the invention, then is driven in a manner to effect the alignment and corrections of the geometric values during rolling of the vehicle.

the measures of step a/ are not taken and the wheel of the vehicle is turned through a selected angle before undertaking these measures;

the information corresponding to the inclination in a vertical plane to the wheel is used to compensate the measurements as a function of the departure of the position of the housing relative to the horizontal.

the display screen is replaced by a display device outside the housing and in communication with the housing by means of a connection block.

the interactive and processing means give indications in real time of the inclination of the housing in the plane parallel to the wheel.

BRIEF DESCRIPTION OF THE DRAWINGS

The invention will be better understood from the description which follows, given by way of non-limiting example, with reference to the accompanying drawings, in which.

DESCRIPTION OF THE PREFERRED EMBODIMENTS

Figure 1:
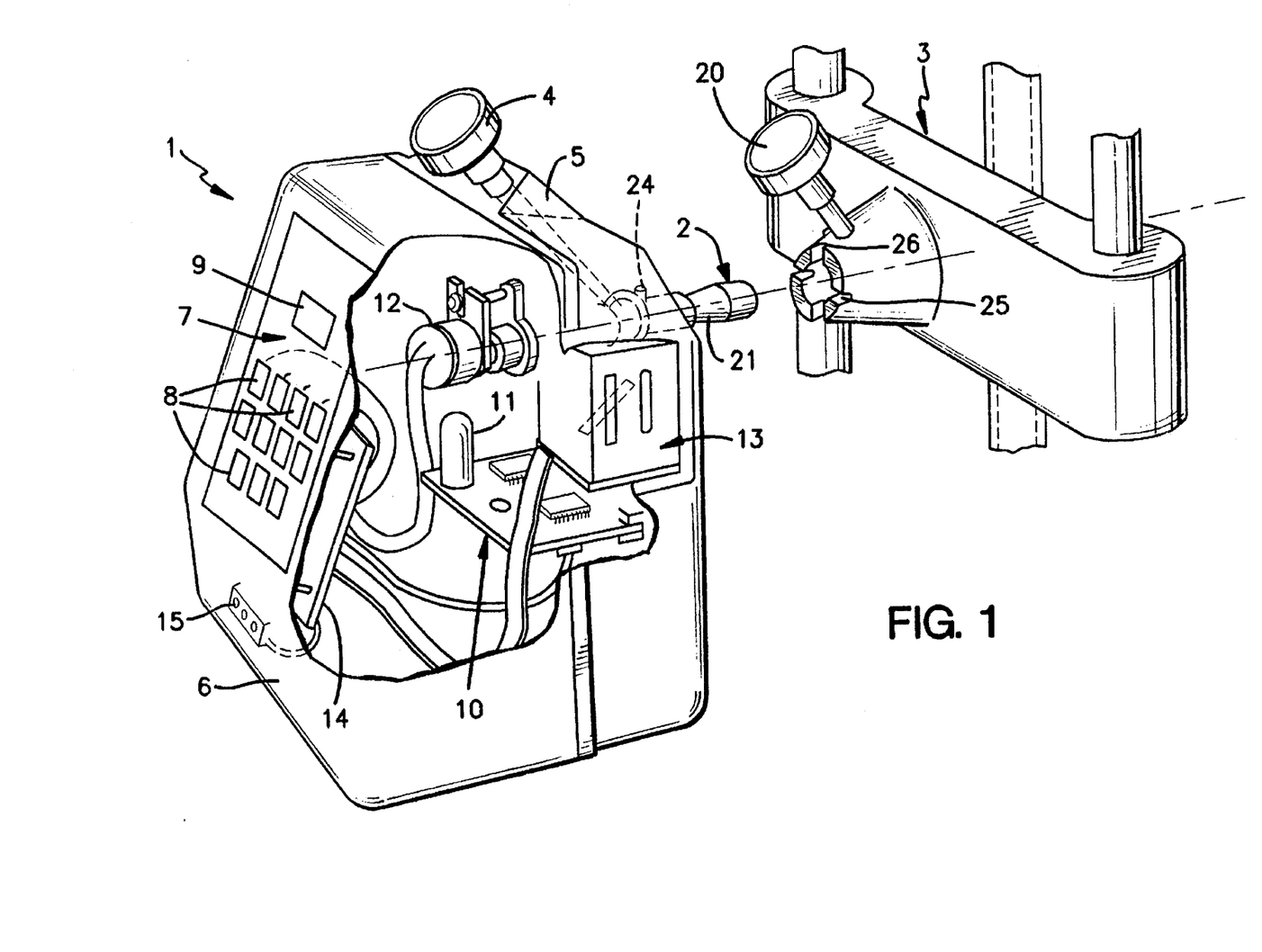
FIG. 1 shows schematically a perspective view with parts broken away of an apparatus according to the invention.

Referring to FIG. 1, a device according to the invention comprises a casing 1 comprising a protruding axle 2 adapted to cooperate with a central member 3 of a support (not shown in its totality) secured to a vehicle wheel by hooking to the edges of the wheel hub by expansion or compression according to the type of wheel rim. The support comprising the element 3 can also be maintained and positioned on the rim of the wheel by other means ensuring secure maintenance on the rim of the wheel.

The axle 2 is mounted rotatively on the casing 1, which permits turning the axle 2 on itself, but not drawing it out of the casing.

The casing 1 comprises a locking screw 4 provided with a knurled knob and coacting with a screw thread provided in the body 5 of the casing molded from a light alloy. The body 5 is closed by a cover 6 on its forward side, carrying a display panel 7 provided with push buttons 8 and a screen 9 permitting the introduction of specific orders according to an interactive mode. Preferably, the sequence of steps to be programmed appears on the screen 9 and requires the operator to press the buttons 8 corresponding to the steps of the inspection process.

Casing 1 contains: an electronic card 10 on which is connected or mounted a biaxial inclinometer 11 of the conductive liquid type permitting measuring the inclination in a vertical plane parallel to the wheel and in a vertical plane perpendicular to the wheel; a potentiometer 12 for following the angle of the wheel; and a camera block 13 comprising a high power light source, preferably of the discharge tube type and a receiver for example of the CCD (charge coupled device) type or DTC (device for transfer of charge) type adapted to measure the orientations of the wheels in the horizontal plane. The outputs of all these receivers are connected to an electronic card 14 for processing and computation comprising one or several programmable microprocessors in known manner: this card 14 is connected to the display panel 7 and an outlet and connection block 15 permitting plugging in suitable plugs, directly below the display panel 7, on the forward surface of the cover 6 of the casing 1. Thus, the outputs of the potentiometric receiver 12 permit knowing exactly the value of the misalignment of the wheel as a function of the angular position of the wheel, while the inclinations of the two vertical planes are known thanks to the inclinometer 11 and to its processing card 10, whereas the orientations in the horizontal plane are known from a casing or camera block 13 which illuminates a camera block 13 of another device fixed on another wheel of the vehicle and receives from this other device an illumination which is detected by the CCD receiver of the camera block 13. In a preferred embodiment of the invention, the biaxial inclinometer 11 of the liquid conductor type is preferably an inclinometer model SP-5000-23013 made and sold by the American company SPECTRON SYSTEMS TECHNOLOGY INC., 595 Old Willets Path, Hauppauge, N.Y., U.S.A. and the potentiometer 12 is preferably a potentiometer model 66395 from the French company BOURNS-OHMICS SA, 21/23 rue des Ardennes, Paris, France.

The present invention is applicable to any unfocused radiation source and any casing comprising any receiver sensitive to such a source of radiation. As a preferred embodiment, there will be chosen an infrared radiation source and a linear receiver of the CCD (charge coupled device) type. The infrared radiation source is for example in the form of an assembly comprising a flash lamp producing a light of a duration of 500 microseconds, with an instantaneous power of 1000 watts and dark intervals of 300 milliseconds corresponding alternatively to the measurement by one or the other casing.

The CCD receiver is for example a linear receiver with 2048 points or pixels, particularly of the type sold by the American company FAIRCHILD or by the Japanese company SONY. A preferred embodiment of camera block or measurement casing is described with reference to FIGS. 5–11.

In known fashion, there is generally used an assembly of four casings for a vehicle having four wheels, the forward casings also carrying at their forward end a rigid arm fixed to the body 5, which arm carries at its end a camera block 13 adapted to shine transversely on another camera block 13 facing it. For a vehicle with two front wheels and two rear wheels, the assembly of the geometric inspection system comprises as a result six camera blocks 13 (four on the front wheels and two on the rear wheels), four inclinometers 11 and associated cards 10 one copy per wheel, four potentiometric receivers 12 one per wheel and four cards 14 for processing and computation, four display panels 7 and four connection blocks 15 again one per wheel. This arrangement is analogous to the arrangement generally shown in FIG. 1 of U.S. Pat. No. 4,311,386.

Figure 2:
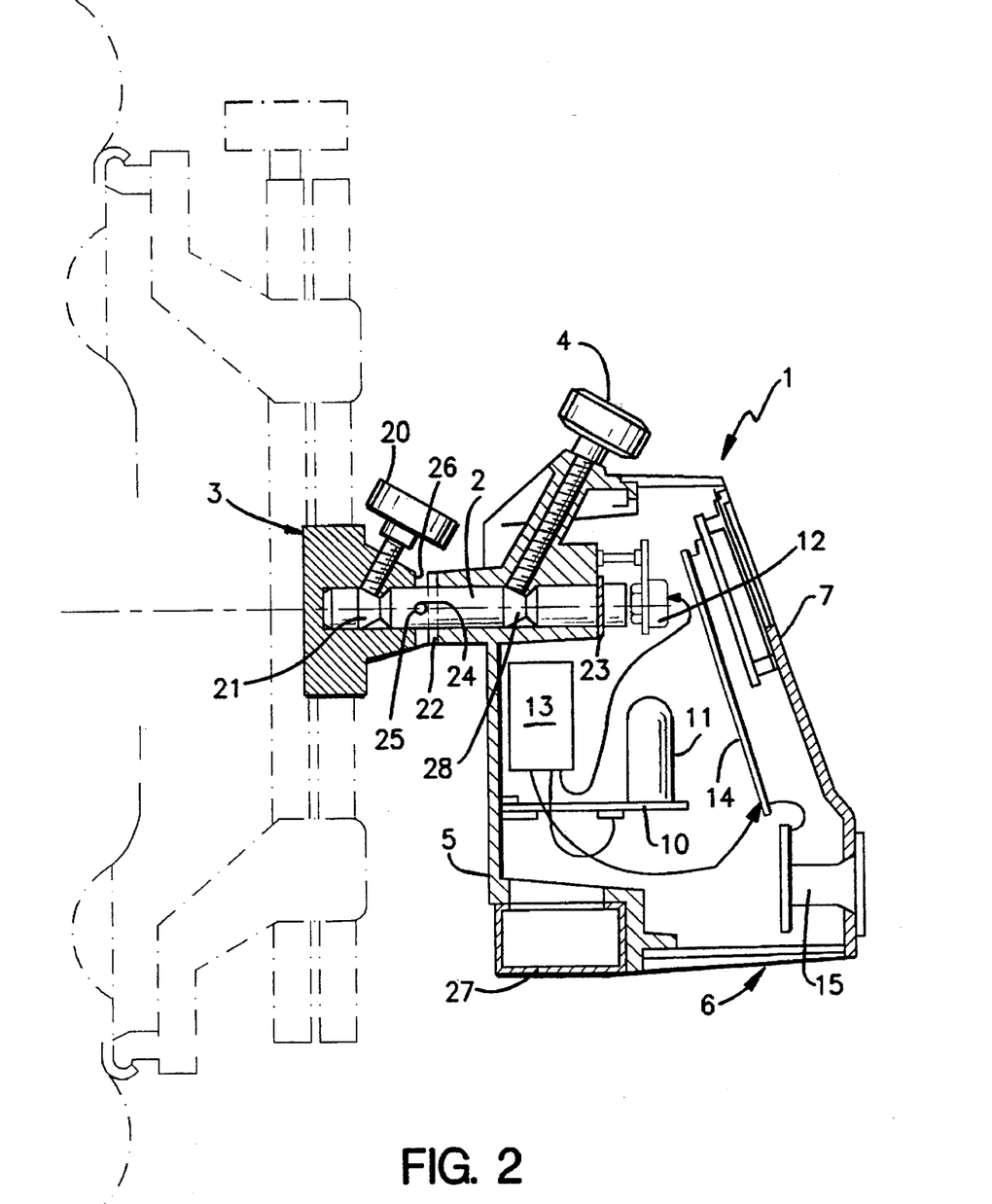
FIG. 2 shows schematically a view in transverse cross section of an apparatus according to the invention.

With reference to FIG. 2, the identical reference elements comprise elements similar or identical to the elements of FIG. 1.

The mounting of the axle 2 in the clamp support element 3 is effected by insertion of the axle 2 into a corresponding bore of the support 3 and by locking of a screw 20 with a knurled knob adapted to lock in the axle 2 by bearing on a conical ramp 21 provided on the axle 2. In this case, the axle 2 is maintained integral and fixed relative to the clamp support 3 on the wheel of the vehicle. The casing 1 is mounted on the axle 2 by means of two resilient rings 22 and 23 generally called circlips by mechanics. This mechanical arrangement, involving the engagement of the casing 1 on the axle 2 along a bore of the casing 1 receiving the axle 2 for a length greater than four times the diameter of the axle 2, thus assures a precise geometric positioning of the casing 1 relative to the axle 2 and relative to the support 3 to which the axle 2 is secured, therefore relative to the wheel of the vehicle on which is mounted the support 3. Similarly, the locking in position by means of two elastic rings ensures a transverse positioning of the casing 1 on the axle 2, which ensures reliable mounting of the casing 1 relative to the support 3 for rotation of the casing 1 about the axle 2. Thus, the casings 1 on the four wheels of a vehicle are at a predetermined fixed distance from each wheel, which does not influence the measurements of the respective orientations of each wheel in the horizontal plane.

In like manner to the securement of the axle 2 on the support 3 by means of the screw 20 with a knurled knob coacting with a conical ramp 21, the casing 1 is fixed relative to the axle 2 by means of a screw with a knurled knob 4 coacting with a second conical ramp 28 machined on the axle 2.

According to a preferred arrangement of the invention, there is machined facing the elastic ring 22 positioned in a first groove of the axle 2: a first flat reference bearing surface at the end of the support 3 and there is machined facing the elastic ring 23 positioned in a second groove of the axle 2 parallel to said first groove: a second flat reference bearing surface on the body 5 of the device 1.

Thus, when the axle 2 is locked in the support 3 by tightening the screw 20 with a knurled knob, the elastic ring 22 comes into geometric contact with said first bearing face and when the casing 1 is locked on the axle 2 by gripping of the screw 4 with a knurled knob, the resilient ring 23 comes into geometric contact with said second bearing surface: as a result, the first and second bearing surfaces are positioned exactly relative to each other, this positioning being invariable despite any intermediate disassembly and reassembly. The invention accordingly provides a reproducible mounting without play, involving no variation of measurement while the equivalent systems of the prior art were subject to positioning errors of the order of 2' to 3' (two or three minutes of arc).

Preferably, the axle 2 is provided with a pin or a transverse axle 24 adapted to coact with a positioning slot 25 of the support 3 to index the axle 2 in position during mounting of the casing 1 and of the axle 2 on the support element 3. Preferably, there are provided two slots 25, 26 ensuring an indexing by 90° of the axle 2 on the support 3.

The casing 1 also comprises means for securing in lower position an arm 27 adapted to carry a camera block 13 at a predetermined distance from the casing 1, this camera block 13 being also connected to the electronic card 14 for processing and computation to determine the geometric values relative to the drive wheels and to effect the necessary corrections of the other values supplied by the other measuring receivers.

The inclinometer 11 and the electronic card 10 continuously measure the inclination of the housing 1 (and of the arm 27 in case of a housing 1 for a front wheel), and transmit the corresponding data to the display screen 9 after processing by the card 14 which processes and computes, which contains a program for the generation of a corresponding indication of the mentioned inclination. This indication is displayed in the form of an angular measurement or in the form represented by a bubble level with an illuminated reference that displaces as a function of the horizontal indication of the casing: the operator is thus directly informed in real time of the mentioned inclination by the "actuated" image by real inclination of the casing and does not need to observe the costly bubble levels of the prior art which can accordingly be omitted.

Figure 3:
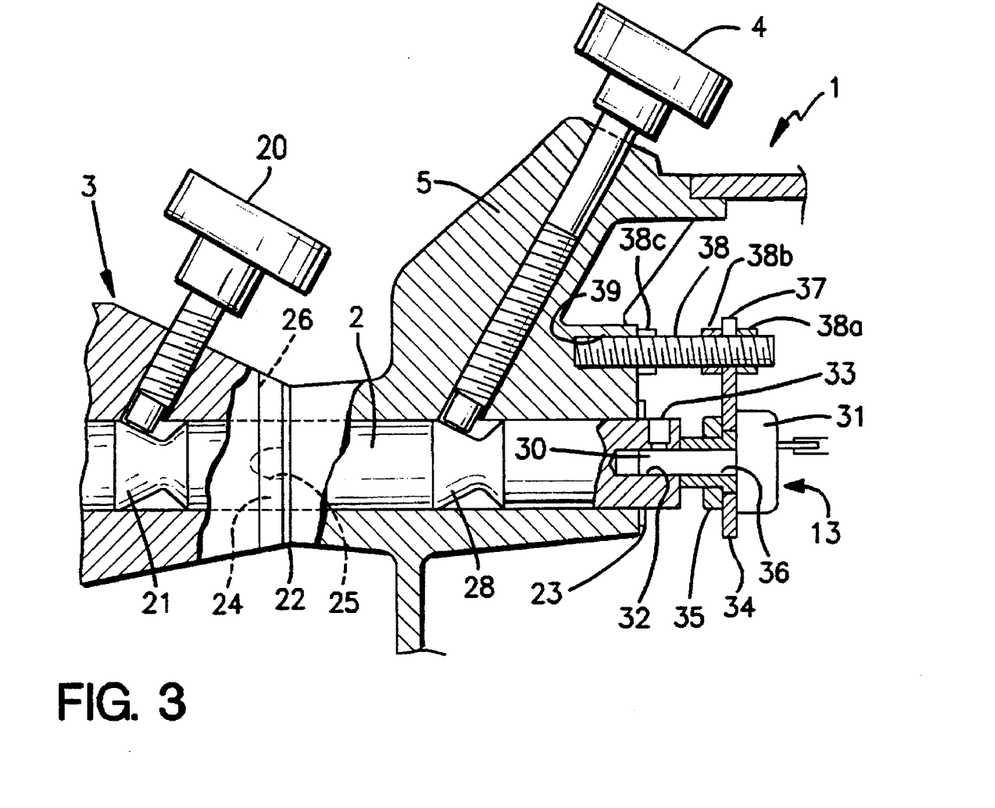
FIG. 3 shows schematically a view in enlarged fragmentary transverse cross section of an apparatus according to the invention.

With reference to FIG. 3, identical reference numerals to FIG. 2 indicate similar or identical elements to those of FIG. 2.

The angular measurement receiver 12 is a receiver of the potentiometer type, whose resistance varies as a function of the angular orientation of the axle 30 of the receiver relative to the body 31 of the receiver. The receiver 12 for measurement of the angular position of the wheels is mounted substantially coaxially of the axle 2 by insertion of its control rod 30 into a bore 32 provided in the axle 2, a screw 33 being provided to block against rotation the axle 30 of the potentiometer within the bore 32 of the axle 2 when the desired adjusted position is achieved. The body 31 of the potentiometer is rigidly gripped on a plate 34 by means of a nut 35, so as to fix securely the body 31 to the plate 34. To this end, the plate 34 is preferably pierced by an opening 36 of suitable diameter, while the end of the plate opposite the opening 36 is provided with machining in the shape of a fork adapted to prevent the rotation of the body of the potentiometer when the axle 2 and the axle 30 of the potentiometer are driven in rotation by the movement of rotation of the wheel, to which they are rigidly connected. The end 37 in the form of a fork coacts with securement means 38 rigidly connected to the casing 1: the securement means 38 is preferably a simple screw 38a provided with a first nut 38b coacting with the head of the screw 38a to secure rigidly in position the fork at the end 37 and a second counter nut 38c preventing the screw 38a from disengaging from the screw threading 39 provided in the body 5 of the casing 1 into which the screw 38a is screwed.

The invention thus provides a simple means for measuring the angular position of the wheels, having practically no mechanical play and providing perfect positioning relative to the axle 2 for connection of the wheel rim to the measurement casing 1, avoiding any play resulting from the mountings of gears and roller bearings of the prior art. This permits using as a measuring detector 12 a potentiometric detector of low cost of the serigraphic track type with a direct electrical outlet, although these known potentiometric receivers have generally the drawback of having a dead zone supplying no measurement over a predetermined angular sector.

Figure 4:
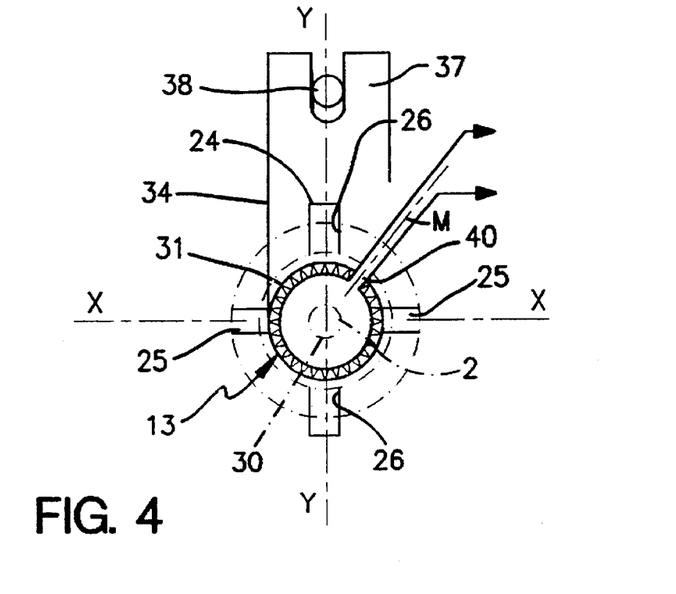
FIG. 4 shows schematically a fragmentary view of a system for the measurement of the wheel angle according to the invention.

With reference to FIG. 4, the reference numerals identical to those of FIG. 3 designate elements similar or identical to those of FIG. 3.

There is indicated by the axes X—X and Y—Y the directions corresponding to the indexing of the pin 24 of the axle 2 on the corresponding slots 25 and 26 of the support element 3 secured to the wheel rim. During mounting the potentiometric receiver 12 on the axle 2, there is provided, before securing by means of the plate 34 and the screw 33 mounted on the axle 2, the body 31 of the potentiometer 12 relative to the axle 30 of the potentiometer 12 such that the angular dead zone corresponding to an emplacement free from serigraphic tracks 40 is located substantially symmetrically relative to an axis M forming an angle of about 45° with the axis X—X or forming an angle of about 45° with the axis Y—Y. Thus, as will be seen hereinafter, during the procedure of alignment by rotation of the wheel by about 90°, there is continuous assurance that the potentiometric detector 12 will not operate in its dead region adjacent the axis M.

In the process of using the apparatus according to the invention, the geometric values obtained as a function of improper coaxiality of the axle 2 with the axis 1 of the wheel and as a function of the misalignment of the wheel, are corrected automatically.

The axle 2 can never be perfectly positioned coaxially of the axis of the wheel, particularly because of the defects on the edges of the wheel rims and manufacturing tolerances of the support fixed on the wheel rim comprising the element 3.

To avoid this drawback, the wheel of the vehicle is raised and turned while maintaining the detector casing 1 substantially horizontal: the detector casing 1 can be maintained horizontal when the screw with knurled nut 4 is unscrewed, which gives rise to rotation of the axle 2 within the casing, which is maintained horizontal.

During rotation of the wheel and of the axle 2 fixed thereto, the camera block 13 comprising a light source and a light receiver measures in the horizontal plane the variations corresponding to misalignment of the wheel, while the card 10 comprising an inclinometer 11 corrects these variations thanks to measurements in vertical planes. There is thus obtained a curve of sinusoidal appearance, called the misalignment of the wheel. When the wheel of the vehicle is deposited in any position whatever, the information corresponding to the angular position of the wheel measured by the potentiometric receiver 12 is transmitted to the treatment and computation card 14 which corrects the values obtained by the other detectors to calculate the angles of parallelism and of squareness corresponding to the mean misalignment of the wheel, while the wheel itself can be located in a different angular position from the mean misalignment.

The process according to the invention is a process of the interactive computer type comprising the following steps.

a/ The display screen 9 indicates to the operator to place the wheel support vertical, to fix rigidly the casing 4 maintained horizontal on the axle 2, to start measurements by means of the recited receivers and to memorize these measurements in memories provided for this purpose on the electronic processing and computation card 14.

b/ The display screen 9 indicates to the operator to unclamp the knurled knob 4 to permit a relative rotation between the axle 2 and the casing 1, to turn the wheel about 90° in a predetermined direction, for example to the left, to start the measurements by the mentioned receivers and to memorize these measurements in the mentioned memories of the electronic card 14.

c/ The display screen 9 indicates to the operator to turn the wheel in the opposite direction to the predetermined direction as mentioned in step b/, for example to the right by about 180°, (this position corresponds to an offset of about 90° relative to the position of the wheel corresponding to step a/, but in the opposite direction to the direction of rotation of step b/), to begin the measurements and to memorize these measurements in the electronic card 14.

The electronic card 14 is programmed so as to determine, thanks to these three assemblies of determined values respectively of steps a/, b/, and c/: on the one hand the value of misalignment of the wheel and on the other hand the value of the corrections to be effected when the wheel is rested in any position on the ground, which position is adjacent one of the indexing positions located substantially outside the dead zone of the potentiometer 12.

The corrections effected thanks to a knowledge of the angular position of the wheel, of the inclination of the casing and of the value of misalignment (sinusoidal curve) characteristic of the wheel, are thus effectuated continuously, which permits effecting the geometric inspection of the vehicle in a particularly simple and rapid manner, because the operator is never obliged to position the casings 1 fixed to the wheels of the vehicle exactly as to level during the phases of alignment and at the moment at which the wheel is rested to measure the angles of parallelism and of the spindle of the wheel to the horizontal: thus, the error of horizontality of the casings 1 according to the invention is automatically corrected thanks to the combination and to the mutual correction of the values thus measured.

The invention thus permits overcoming the drawbacks of the apparatus and methods of the prior art, in which it was necessary to know the angular position of the wheel once it rested at the end of alignment. It is known that particularly for the front wheels the suspension arm undergoes during resting on the wheel a parasitic rotation of the wheel of about 10° between the time the tire touches the ground until complete resting on the wheel and the application of the corresponding load to the ground.

The invention also overcomes other drawbacks of the prior art, resulting from the fact that the operator was formerly obliged to turn the wheel into extremely precise positions to effectuate alignment: these apparatus and methods of the prior art could not automatically compensate the variation of angular position of the wheel.

To practice the invention, it suffices thus to turn the wheel according to the steps a/, b/, c/described above by an angle which can be about 90° plus or minus about 10°, the precise value of this angle being automatically supplied by the angular position receiver 12. The programmable electronic processing card 14 then defines the sinusoid corresponding to the misalignment as a function of the real values of the angular positions which are transmitted to it by the receiver 12.

The invention moreover permits effecting all of the geometric measurements of the vehicle without raising the wheel during the alignment phase: thus it suffices to drive the vehicle wheel in rotation by a rolling belt or a motor driven roller of known type for taking the measurements permitting corrections of the geometric values according to the three steps a/, b/and c/ mentioned above. There could also be envisaged an overall measurement, in which the automobile circulates while being provided with devices according to the invention, in a manner to effect the alignment and the corresponding corrections of the geometric values simultaneously: the three points of alignment corresponding to rotations of 90° in the clockwise direction and counter-clockwise direction of the wheels relative to a position are then preferably taken while the vehicle is in motion.

For vehicles requiring a high quality geometric measurement, it is possible to refine the measurements of misalignment and the necessary geometric corrections by taking a number of predetermined points to define more exactly the sinusoidal curve corresponding to the misalignment and supplying the corresponding correction values.

To this end, when taking the sets of measurements corresponding to an angular position of the wheel or wheels, there is defined the sinusoidal curve of misalignment for example by the method of least squares by minimizing the deviation of the sinusoidal theoretical function that is sought, relative to the set of measurements obtained during a predetermined number of steps of measurement of the type recited. Of course, the computation method that uses the minimization technique of least squares could be replaced by any other appropriate statistical method.

Figure 5:
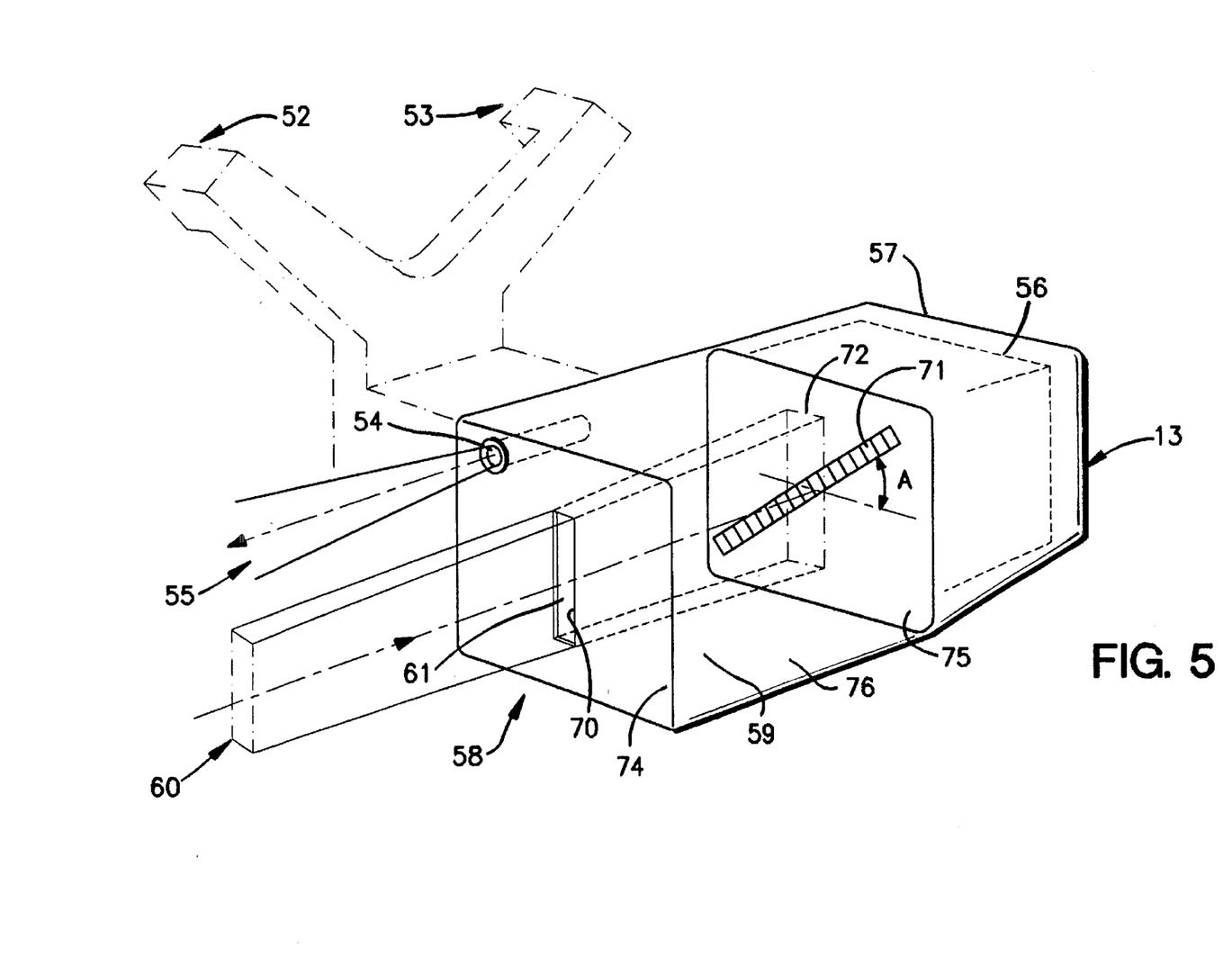
FIG. 5 shows schematically in perspective a preferred embodiment of a casing for the measurement of the orientation of the wheel in the horizontal plane according to the invention.

With reference to FIG. 5, a measurement casing 13 or camera block of the device according to the invention is connected to securement means on a vehicle wheel rim to be measured, said securement means comprising for example hooks or claws 52, 53 and means for symmetrical adjustment as to height (not shown).

The casing 13 supports a source 54 of light radiation 55 directed toward another casing (not shown) secured to another wheel. From the side opposite the outlet of light 55, the casing 13 contains an electronic module 56 for measuring and supply, accessible by removing a protective cap 57. The casing has an envelope shape 58 which is substantially parallelepipedal, containing the source 54 constituting an optical emitter and an internal space 59 adapted for the optical reception of radiation 60 from the other mentioned casing 13. The internal space 59 is sealed from impurities and is entirely closed by lateral walls, of which one contains a filter 61 transparent to incident radiation 60 located at an inlet slot of the light to the interior of the space 59.

Figure 6:
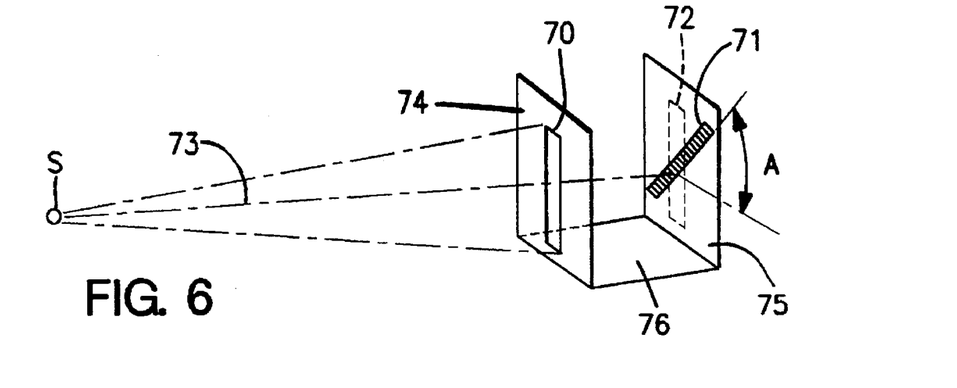
FIG. 6 shows schematically and partially a first embodiment of the casing for the measurement of the orientation of the wheel in the horizontal plane according to the invention.

With reference to FIGS. 5 and 6, an internal optical mounting on a casing 13 of apparatus according to the invention comprises confronting a radiation source S fixed to another casing, with a definition slot 70 that defines the image 72 from the source S on the linear detector 71 sensitive to radiation from the source S.

Of course, the collimation slot 70 can be replaced by a cylindrical lens or any other optical element without departing from the scope of the present invention.

The detector 71 is inclined at an angle A to the plane passing through the longitudinal axis of the slot 70 and the longitudinal axis of the image 72 of the source S on the detector 71. By thus inclining the detector in the plane perpendicular to the optical axis 73 at an angle A, it will be seen that the apparent width of the pixels decreases, which gives rise to an increase in resolution of the pixels or points of the linear detector 71.

More precisely, the apparent width of the pixels relative to the slot is multiplied by the cosine of the angle of inclination A: the resolution is thus multiplied by the inverse of the cosine of the angle of inclination A;

The angle A is preferably comprised between 30 and 60 degrees of arc; the resolution is thus in this case increased by 15% to 100%.

This particular embodiment of the invention thus permits, by means simply of the recited inclination A, to obtain a resolution greater than that with constant measurement casing dimensions. The apparatus according to the invention differs from known apparatus by the arrangement of the casings recited above and the corresponding modifications of the data processing software which is a part of these apparatus: the plate 74 or like support structure of the slot 70, the plate 75 or like support structure of optical receiver CCD which is substantially parallel to the mentioned plate 74 and the connection plate 76 or rear of the casing (not shown) are in this case identical or similar to the plates and/or structures of known casings.

Figure 7:
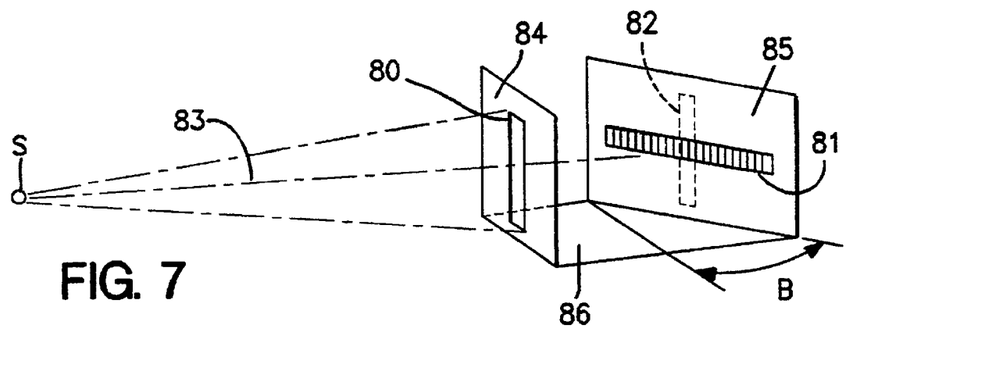
FIG. 7 shows schematically and partially a second embodiment of the casing for the measurement of orientation of the wheel in the horizontal plane according to the invention.

Referring to FIG. 7, another internal optical mounting with a casing for a device according to the invention also comprises a definition slot 80 facing a source S of radiation secured to another casing. An optical linear detector 81 is disposed so as to receive the image 82 of the source S collimated by the slot 80 or like collimation means.

According to the invention, the linear detector 81 disposed on the path of the optical axis 83 is disposed at an angle B with the direction parallel to the plate 84 in which is provided the slot 80. To this end, the plate 85 or like structure for support of the CCD optical receiver 81 is mounted relative to the plate 86 in fixed connection to the measurement casing (not shown) at an angle B comprised preferably between 30 and 60 degrees of arc: this arrangement gives rise consequently to an increase of resolution comprised between 15% and 100% relative to the apparatus of the prior art.

In this modification, the change of geometric arrangement gives rise either to the change to a prismatic shape of casing, or maintaining a parallelepipedal shape and a change of arrangement of the modules and electronic components disposed ordinarily on the back of the support plate 85.

Figure 8:
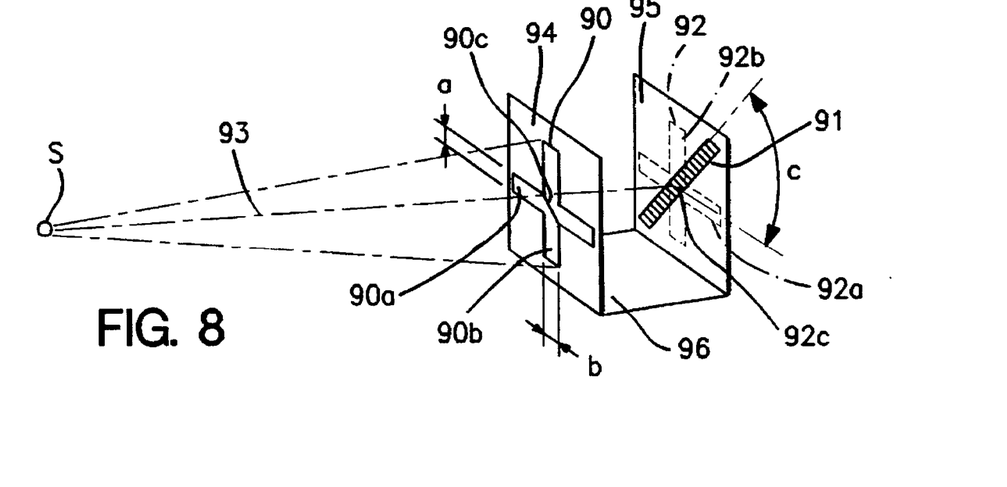
FIG. 8 shows schematically and partially a third embodiment of the casing for measuring the orientation of the wheel in the horizontal plane according to the invention.

Referring to FIG. 8, another optical mounting to a casing of a device according to the invention comprises two slots of unequal width forming a definition cross 90 on a linear optical receiver 91 of an image 92 from a source S of radiation secured to another casing.

The definition cross 90 comprises a substantially horizontal slot 90a of a width a and a substantially vertical slot 90b of a width b. To permit better discrimination of the images 92a and 92b from the radiation source S and to deduce from them the corresponding angular displacements respectively about vertical and horizontal axes, the widths a and b can be different from each other by a value greater than or equal to five times the width of a CCD receiver bar: in the case of a linear CCD receiver with 2048 points having a bar width of 14 micrometers, the widths a and b accordingly differ by at least 70 micrometers.

In this example, the plane of the cross shaped slot 90, which is to say the support 94 and the plane of the linear receiver 91, which is to say the support 95, are substantially parallel to each other. The linear optical receiver 91 is inclined in the plane 95 so as to form an angle C with the image 92a of the horizontal slot 92.

There is preferably disposed at the center of the cross 90 a filament 90c or a reticle, preferably so that the initial position of the optical path 93 connecting the source S of radiation to the center of its image 92 will pass this filament or reticle 90c: the filament 90c or reticle is inclined such that, in this position, its shadow 92c will obscure one or several bars of the linear receiver 91.

This arrangement thus defines a mark of origin corresponding to the image 92c of the filament or reticle 90c and permits considering that the source S of radiation gives two images on the cells of the optical receiver, separated by the original image 92c. The images thus defined in the plane 95 parallel to the slot 90 give by simple computation the indication of the position of the source S relative to the vertical and the horizontal and supply by simple trigonometric computation the corresponding angular variations.

By way of example, if we call f the distance between the slot 90 and the image 92 of the source S of radiation, and x the horizontal displacement relative to the origin, and y the vertical displacement relative to the origin, the angles H and V of displacement respectively about the vertical and the horizontal of the incident ray are given by the following formulas:

H=Arctan (x/f)

V=Arctan (y/f)

The invention thus permits by this use in a particularly economical manner, to effect a measurement in two dimensions or to obtain two angular values by means of a single linear optical receiver while avoiding the need consequently for costly matrix cells of the prior art.

The angle of inclination C is preferably comprised between 30 and 60 degrees of arc; a value of angle C equal to 45 degrees gives complete satisfaction; but it is also possible to define the value of the angles of inclination C as a function of the resolution required respectively vertically or horizontally.

It is also possible to provide a plane 95 which is not parallel to slot 90, such that the linear receiver 91 will be disposed with a supplemental angle $B_1$ about the vertical, in a manner analogous to the embodiment of FIG. 7: however, in this case, the angle $B_1$ is preferably comprised between 0 and 45 degrees of arc.

Of course, the slots described with reference to FIGS. 5–8 can be replaced by filaments or opaque combs, so as to define the shadows or inverted images on the linear detector 71 or 81 or 91, without departing from the scope of the present invention.

The invention also relates to the case of several slots parallel to each other: this advantageous modification (not shown) permits by using the arrangements described with reference to FIGS. 5–7, to cover the whole range of measurement whose extent is about 25 degrees of arc, by means of three parallel slots while obtaining a resolution of 20 seconds of arc by direction of the linear optical receiver.

Of course, the number of slots that are parallel (or even perpendicular to each other) could be increased so as to increase the measurement range.

This result is obtained as well in the device according to FIG. 6 as in the arrangement analogous to that of FIGS. 7 or 8.

This modification of the invention, described with reference to slots provided by cutting out material or chemical etching or any other process for removal of material opaque to radiation, is applicable of course to the system comprising the slots termed "dynamic" by those skilled in the art, provided for example by control of the opacity of a liquid crystal screen movable electrically to simulate a displacement of a slot by opacifying in a selected manner different segments of the liquid crystal screen. To produce these "dynamic" slots, it is also possible to displace the cutout slots or scored slots by means of a motorized system or any other mechanical displacement means, piezoelectric or the like.

It is preferable to use several parallel slots or one equivalent dynamic slot, because this arrangement permits obtaining moreover the angles H and V recited above, by triangulation to calculate by degrees all the distances and all the variations characteristic of the inspected vehicle, in an economical way by means of a sole linear receiver.

Figure 11:
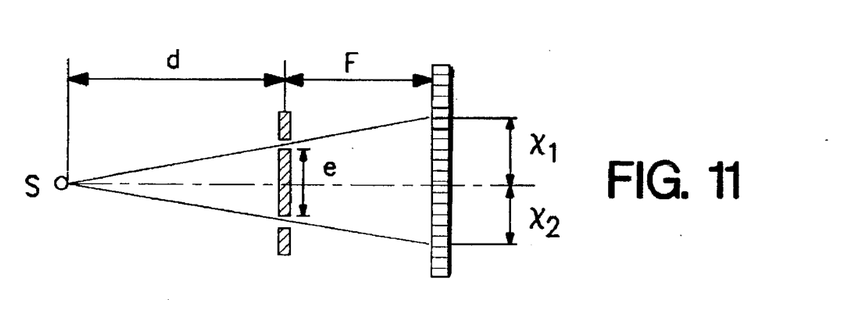
FIG. 11 shows schematically the use of the casing for measuring the orientation of the wheel in the horizontal plane according to the invention, in the measurement of distances by triangulation.

In particular, the distance d from the source S to the plane of the definition slots is achieved in the case of FIG. 11 by solving the following equation:

$$\frac{d+f}{d} = \frac{x_1 + x_2}{e},$$

wherein e is the spacing between the slots, f the distance between the slot and the image, $x_1$ and $x_2$ the distances from the images to the optical axis of the receiver.

Figure 9:
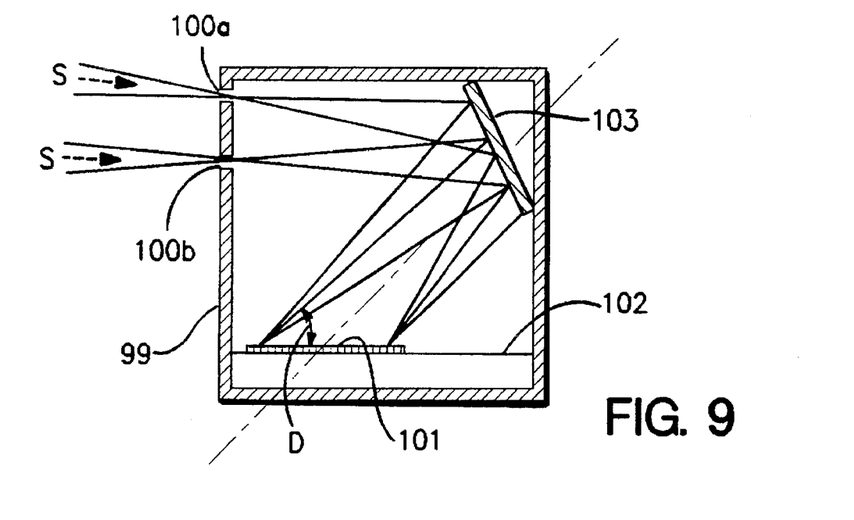
FIG. 9 shows schematically and partially a fourth embodiment of the casing for measuring the orientation of the wheel in the horizontal plane according to the invention.

With reference to FIG. 9, a casing 99 shown schematically in cross section by a vertical plane, comprises in facing manner two slots 100a, 100b parallel to each other and transparent to radiation from a source S (not shown), so as to define an image of the source S on a linear optical receiver 101 that is substantially flat and oriented at an angle D relative to the optical axis of the incident radiation.

The angle D is preferably comprised between 30 and 60 degrees of arc; in the illustrated embodiment, the angle D is substantially equal to 45 degrees.

The invention is similar as to this modification to the modifications described with reference to FIGS. 5–8; however, so as to minimize the volume and the external dimensions of the casing 99, it is provided in this example to deflect once the incident light beam before illuminating the optical receiver 101 mounted on the support 102.

The deflection of the light beam results from the installation of a flat mirror 103 or like reflecting member which returns and concentrates the incident light beam on the linear optical receiver 101: to this end, the flat mirror 103 or the like is inclined relative to the direction of the instant light beam by an angle D/2, for example an angle of 22½ degrees of arc.

This fourth embodiment permits a particularly compact production: thus, by way of example, the dimension of the side of the square section of the housing is in this example less than 60 mm.

Figure 10:
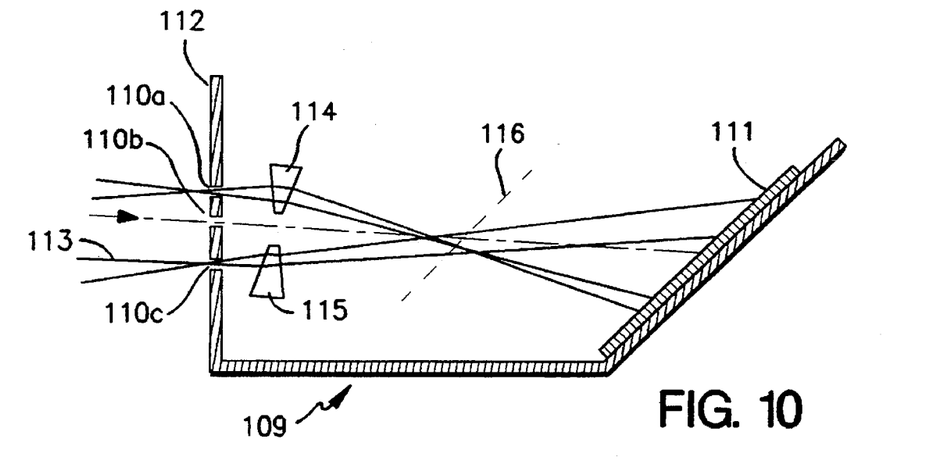
FIG. 10 shows schematically and partially a fifth embodiment of the casing for the measurement of the orientation of the wheel in the horizontal plane according to the invention.

Referring to FIG. 10, a casing 109 comprises three slots 110a, 110b, 110c disposed substantially parallel to each other and provided in a wall 112.

Each slot 110a or 110b or 110c is adapted to cover a predetermined range of angular measurement, so as to supply an image from a light source (not shown) to a linear optical detector 111.

When it is desired to measure a relatively wide angular range of the order of 30 degrees of arc, it is necessary to provide a relatively great distance between slots. In this case, the spacing between the outer slots 110a and 110c and the middle slot 110b has as a result a substantial variation from the distance of the radiation source to each of the slots 110a and 110c, which gives rise to a variation of the measured angle as a function of the distance to the source.

In this modification, it is provided to deflect the optical rays passing through the outer slots 110a and 110c, so as to cause the slots 110a and 110c to approach the slot 110b while keeping the same range of angular measurement. This arrangement has the advantage of being able to decrease the size of the casing.

To deflect the optical rays toward the axis 113 of the optical system, it is provided to mount two prisms 114 and 115 of known type behind the slots 110a and 110c.

By way of example, an optical mounting, in which the slots 110 are spaced from each other a distance less than 3 mm and in which the deflector prisms 114 and 115 deflect the outer optical rays by an angular value of about 9½ degrees of arc, gives complete satisfaction.

In FIG. 10, the linear receiver 111 is mounted in a plane forming an angle with the direction parallel to the plane 112; the invention is not limited to this arrangement of receiver but also covers all the arrangements of receiver combining FIG. 10 with any one of FIGS. 5–9 or several thereof.

In particular, if it is desired to obtain an apparatus casing according to the invention that will be particularly compact, one can mount a mirror 116 shown in broken lines downstream of the prisms 114 and 115 to obtain an arrangement analogous to that of FIG. 9.

The measurement casings according to the invention described with reference to a linear optical receiver of the CCD type can comprise any other type of linear optical receiver; for example receivers called PSD (position sensitive detectors), by those in the art.

We claim:

1. Apparatus for the geometric inspection of a vehicle, comprising an interactive display panel adapted to guide an operator according to instructions emitted by a first electronic card for processing signals from measurement means and computing values from said signals, said measurement means including:

first means for measuring the orientation of a vehicle wheel in the horizontal plane, second means for measuring the rotational angle of the wheel about its axis, third means for measuring inclinations in a first vertical plane perpendicular to, and in a second vertical plane parallel to, the wheel; said third means being connected to a second electronic card;

said measurement means emitting electrical signals representative of indications correlated with the physical parameters to be detected for the geometrical inspection of the vehicle;

said measurement means being contained in a casing with an axle protruding from the casing, said axle being mounted for rotation in the casing and engaging with its protruding end and being fixed to a support element secured to the wheel of the vehicle to be inspected;

wherein said first means is in the form of a camera block comprising one linear optical detector and means for defining an image from an external source upon said linear optical detector; said second means is a rotational potentiometer having a rotational axis disposed substantially coaxial and substantially coincident with said axle for following the wheel in its rotational movement about its axis; and said third means is a biaxial inclinometer for measuring the inclinations in the first and second vertical planes and being mounted on said second electronic card.

2. Apparatus according to claim 1, wherein the axle has two conformations that are parallel and spaced apart, of which the first comes to bear against an emplacement on the support element and of which the second comes to bear on an emplacement on the casing, so as to supply a reproducible and invariable mounting of the casing on the support element by means of the axle after relative blocking between the casing, the axle and the support element.

3. Apparatus according to claim 1, wherein said camera block comprises at least one slot transparent to light rays for defining an image transmitted from an external source and at least one linear optical detector disposed downstream of said at least one slot in the direction of incidence of a beam of the light rays to detect the image of the source formed by said at least one slot, and wherein said at least one detector is inclined at an acute angle to a plane passing through a longitudinal axis of said at least one slot and a longitudinal axis of the image of the source on said at least one detector.

4. Apparatus according to claim 3, wherein said acute angle is comprised between 30 and 60 degrees of arc.

5. Apparatus according to claim 3, wherein said at least one detector is disposed in a plane parallel to the plane of said at least one slot and forms with the direction perpendicular to a longitudinal axis of said at least one slot an acute angle.

6. Apparatus according to claim 3, wherein said at least one detector is located in a plane which makes an acute angle with the optical axis of the incident beam.

7. Apparatus according to claim 3, which further comprises at least one mirror to return the incident beam, so as to minimize the volume and dimensions of the casing.

8. Apparatus according to claim 3, which further comprises at least one additional casing which has several slots for image definition.

9. Apparatus according to claim 8, wherein said additional casing comprises at least one prism to deflect the light beam, so as to minimize the spacing between slots.

10. Apparatus according to claim 3 wherein said at least one slot is in the shape of a cross comprising two perpendicular slits.

11. Apparatus according to claim 10, wherein the cross supports adjacent the optical axis a pattern adapted to be projected on a linear optical detector bar.

12. Apparatus according to claim 3, further comprising a filament or an opaque comb to define an inverted image on the linear optical detector.

13. Apparatus according to claim 3, wherein the width of a given slot is different from the width of another slot.

14. Apparatus according to claim 3, wherein one slot is a dynamic slot.

15. Apparatus according to claim 1, wherein the casing carries a light source which is a gas tube lamp producing illumination between two electrodes, which illumination is of a predetermined duration at predetermined intervals of time.

16. Apparatus according to claim 1, wherein the second means for measuring the rotational angle of the wheel is mounted directly coaxially on said axle.

17. Apparatus according to claim 16, wherein the second means for measuring the rotational angle of the wheel is a potentiometric receiver.

18. Apparatus according to claim 1, wherein the second means for measuring the rotational angle of the wheel comprises an angular dead zone.

19. Apparatus according to claim 1, wherein the axle carries an indexing means of the side of the protruding end engaging with the support element, so as to mount the axle and the casing in horizontal position at a preadjusted angular position.

20. Method of geometrically inspecting a vehicle using a geometric inspection apparatus having an interactive display panel including a display screen for guiding an operator according to instructions emitted by an electronic card processing signals from a measurement device and computing values from said signals, said measurement device including first means for measuring the orientation of a vehicle wheel in the horizontal plane, second means for measuring the rotational angle of the wheel about its axis, third means for measuring inclinations in a first vertical plane perpendicular to, and in a second vertical plane parallel to, the wheel;

said measurement device emitting electrical signals representative of indications correlated with the physical parameters to be detected for the geometrical inspection of the vehicle;

said measurement device being contained in a casing with an axle protruding from the casing, said axle being mounted for rotation in the casing and engaging with its protruding end and being fixed to a support element secured to the wheel of the vehicle to be inspected, said second means having a rotational axis disposed substantially coaxial and substantially coincident with said axle for following the wheel in its rotational movement about its axis;

said display panel including interactive means which together with the electronic card give indications in real time of the inclination of the casing in a plane parallel to the wheel; said method comprising the following steps:

displaying on the screen an indication to the operator to place the wheel support element in the vertical position, to fix rigidly the casing maintained horizontally on the axle, to begin a first set of measurements by the first, second and third means of the measurement device, and to store this first set of measurements in memories provided on the electronic card;

emitting on the screen an instruction to the operator to loosen a knob to permit relative rotation between the axle and the casing, to turn the wheel through a first angle in a predetermined direction, to take a second set of measurements by the first, second and third means of the measurement device, and to store this second set of measurements in the memories of the electronic card; and displaying on the screen an instruction to the operator to turn the wheel in another predetermined direction, by a second angle different from said first angle, to begin a third set of measurements, and to store this third set of measurements in the electronic card.

21. Method according to claim 20, wherein the operator turns the wheel from one step to the following step with an angular precision of the order of 30 degrees of arc.

22. Method according to claim 20, wherein the vehicle wheel is driven in rotation by motorized means.

23. Method according to claim 20, wherein the wheel of the vehicle is steered through a predetermined angle before beginning measurements.

24. Method according to claim 20, wherein information corresponding to the inclination in a vertical plane parallel to the wheel is utilized to compensate the measurements as a function of the deviation of the position of the casing from the horizontal.

* * * * *